United States Patent [19]

Novotny

[11] 4,098,695

[45] Jul. 4, 1978

[54] DISTRIBUTOR-COLLECTOR ASSEMBLY

[75] Inventor: Charles J. Novotny, Hickory Hills, Ill.

[73] Assignee: Industrial Filter & Pump Mfg. Co., Cicero, Ill.

[21] Appl. No.: 791,290

[22] Filed: Apr. 27, 1977

[51] Int. Cl.² .................. B01D 35/02; B01D 35/14
[52] U.S. Cl. .................................. 210/85; 210/153; 210/232; 210/279; 210/289; 210/292; 210/293; 210/323 T; 210/457; 210/497 R; 285/93; 403/27
[58] Field of Search ................... 285/93; 403/27; 210/279, 289, 291-293, 323 T, 85, 153, 497 R, 232, 457

[56] References Cited

U.S. PATENT DOCUMENTS

| 377,388 | 2/1888 | Jewell | 210/288 |
|---|---|---|---|
| 1,273,174 | 7/1918 | Noakes | 285/93 |
| 3,556,299 | 1/1971 | Zievers et al. | 210/279 |
| 3,685,657 | 8/1972 | Hunter et al. | 210/289 |

Primary Examiner—Frank Sever
Attorney, Agent, or Firm—Edmond T. Patnaude

[57] ABSTRACT

An axially rigid, tubular grid is fitted over a conduit having a single longitudinal row of apertures; a fine mesh flexible tube is fitted over the grid; an end cap closes one end of the conduit and seals the tube thereto; and a tubular connection is threaded onto the other end of the conduit to seal the adjacent portion of the flexible tube to the conduit.

2 Claims, 3 Drawing Figures

DISTRIBUTOR-COLLECTOR ASSEMBLY

The present invention relates in general to a novel filter cartridge and distributor-collector assembly for use in processing vessels. The apparatus and method of the present invention are improvements over the invention disclosed in pending application Ser. No. 740,815 filed by Henry Schmidt Jr., and assigned to the same assignee as the present invention.

BACKGROUND OF THE INVENTION

Processing columns commonly contain a bed of granular material such, for example, as ion exchange resin, through which a liquid is passed to treat either the liquid or the granular material. In order to distribute the liquid uniformly to the bed, a plurality of interconnected apertured conduits are ordinarily arranged across either the top or bottom of the bed on the upstream side thereof. In like manner the liquid which has passed through the bed may be collected by a similar arrangement of apertured tubes on the downstream side of the bed. In many processes the same tubes are used both for purposes of distribution and collection in in different steps of the process.

In order to prevent the granular material from exiting the processing vessel along with the liquid, the distributor-collector conduits are ordinarily covered with a filter medium such, for example, as a tube of fine mesh woven cloth. In order to maintain the integrity of the seals between the ends of the cloth tube and the underlying apertured conduit, metal clamps which tightly compress the end portions of the cloth tube against resilient rings disposed on the conduits have generally been used.

Inasmuch as many processes involve the treatment of liquids which are corrosive to most metals or which themselves become contaminated by most metals, it is desirable to provide a distributor-collector system which is made entirely of plastic or other inert material and yet maintains the integrity of the seals between the filter cloth and the underlying conduit. Also, it is important to provide a distributor-collector system which may be easily disassembled for maintenance and replacement of the fine mesh cloth tube when necessary.

Many distributor-collector systems are custom designed for particular applications. Accordingly, maintaining an inventory of such parts for replacement or repair is necessarily costly. It is therefore, desirable to provide a distributor-collector system utilizing only standard parts but adaptable to use in various custom engineered applications.

In the copending Schmidt application referred to above, there is disclosed a distributor-collector assembly having no metallic parts and which employs filter cartridges which may be assembled in the field from a few basic parts. Since the apertures in the cartridges are preferably arranged in a row at the bottom of the cartridge, a problem with the said system has been the difficulty in properly orienting the cartridges in the distributor-collector assembly. Moreover the cartridge design disclosed in the said application requires that the filter cartridges be assembled at the time the distributor-collector assembly is being fabricated inasmuch as one part of each cartridge assembly is also a part of the manifold.

SUMMARY OF THE INVENTION

Briefly, there is provided in accordance with the present invention a distributor-collector assembly which may be fabricated in situ from a plurality of completely non-metallic cartridges which have been pre-assembled. Each such cartridge comprises an externally threaded connector carrying an external reference mark indicating the location of the row of apertures in the cartridge. The connector is adapted to be threaded into the distributor-collector assembly and is provided with a pipe thread so that the angle of the cartridge in the assembly may be adjusted. Assembly of the cartridges into the complete distributor-collector is thus facilitated and inspection of the final assembly for proper aperture orientation is thus made possible.

Further advantages and a better understanding of the present invention can be had by reference to the following detailed description, wherein.

DETAILED DESCRIPTION OF THE INVENTION

Figure 1:
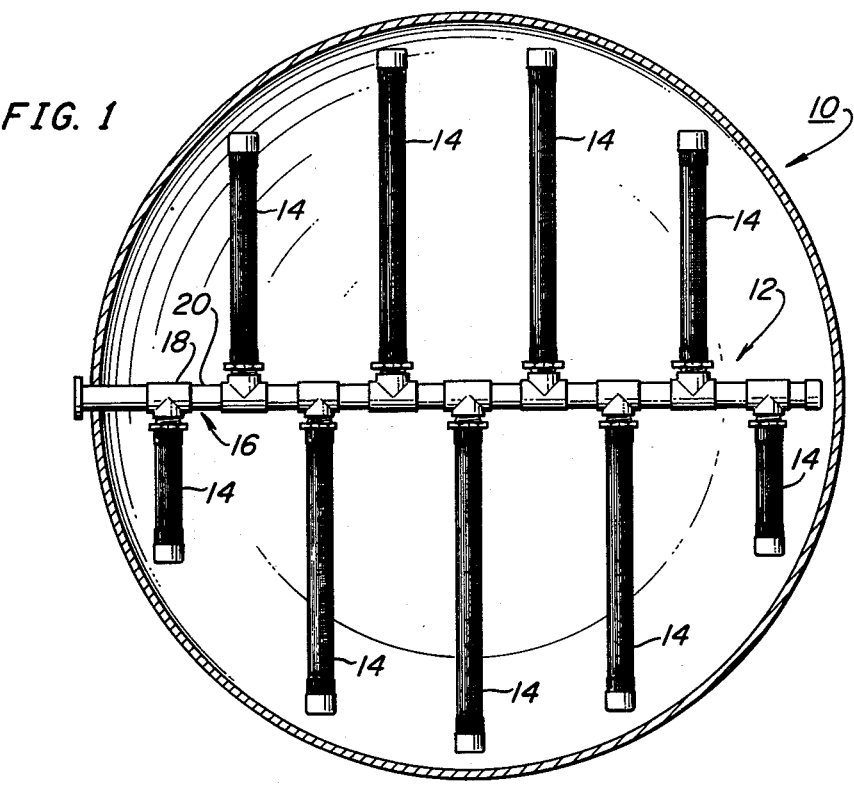
FIG. 1 is a horizontally sectioned view of a processing vessel incorporating a distributor-collector assembly embodying the present invention.

Referring particularly to FIG. 1 of the drawing, a cylindrical processing vessel or tank 10 in the form of a vertical column is adapted to contain a bed of granular material (not shown) for contact with a liquid passing in a generally vertical direction through the bed. In order to introduce liquid to one end of the column and/or to collect liquid from one end of the column, a distributor-collector assembly 12 is mounted across the column near either the top or the bottom. When located at the top of the column the distributor-collector assembly is located a short distance above the granular bed. When located at the bottom of the column the distributor-collector assembly may rest on the bottom wall of the column directly under the granular bed. When liquid is supplied to the column through the assembly 12, the assembly functions as a distributor. When, on the other hand, liquid is removed from the column 10 through the assembly 12, the assembly functions as a collector.

The present invention relates to the construction of the individual filter cartridges used in the distributor-collector assembly and to the method of fabricating the assembly. The distributor-collector assembly 12 may be seen in FIG. 1 to comprise a plurality of filter cartridges 14 which are closed at the outer ends and which are connected at the respective inner ends to a diametrically extending tubular manifold 16. The manifold 16 is made up of a plurality of plastic T-shaped fittings 18 and intermittent lengths of straight plastic tube 20 threadedly connected to the fittings 18. Although the fittings 18 are illustrated as being T-fittings, it will be understood by those skilled in the art that the present invention may be utilized in a distributor-collector assembly wherein each of the fittings is provided with an additional connector opening for receiving another filter cartridge in substantial alignment with the oppositely disposed cartridge.

Each of the cartridges 14 is provided with a single row of apertures whose size and location are calculated to provide a uniform and desired liquid flow rate through the granular bed. Ordinarily the row of apertures is at the bottom of the cartridges 14 so that when the cartridges lie on the bottom surface of the column 10, the apertures are facing the bottom surface. Because of the importance of maintaining the calculated flow rate through these apertures, it is important that the cartridges be oriented in the proper direction for which the apertures were designed. The present invention enables the fabrication of the manifold 16 to facilitate the proper orientation of these apertures.

Figure 2:
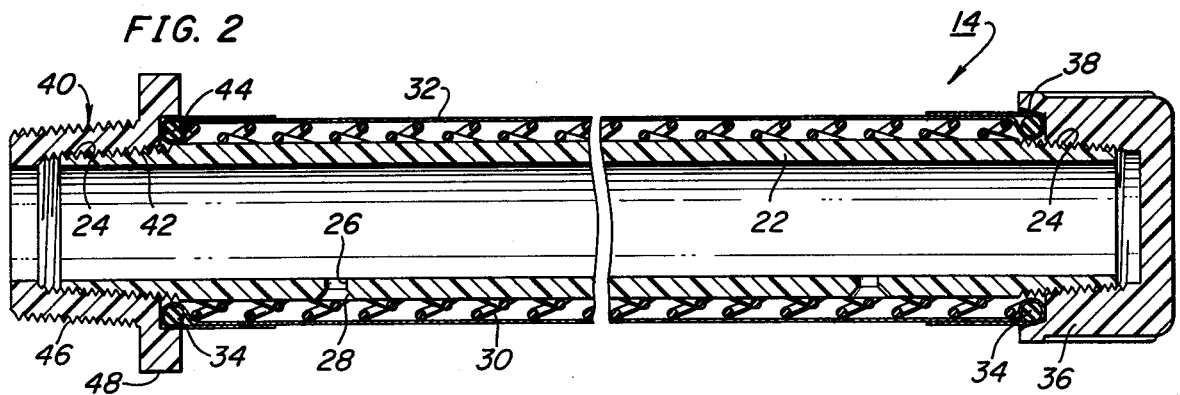
FIG. 2 is a longitudinally sectioned view of a filter cartridge embodying the present invention.

Referring to FIG. 2 where is shown a filter cartridge 14 embodying the present invention. A substantially rigid plastic conduit 22 is provided with external pipe threads 24 at the respective ends and is provided with a single longitudinally extending row of holes or apertures 26. It will be noted that these apertures have a flaired outer end surface portion 28 for ensuring a uniform flow rate through the hole 26 irrespective of the particular location of a grid 30 located thereon. The grid 30 is tubular and is substantially noncompressible in an axial direction. As shown in FIG. 2 the grid 30 fits snugly onto the conduit 22 and is substantially shorter than the conduit 22 wherefor the ends of the conduit extend beyond the ends of the grid.

A fine mesh tubular flexible filter material 32 is fitted over the spacer grid 30 and prevents the granular material from flowing into the assembly 12 when it is used as a collector. The material 32 may be woven cloth fabric and is substantially longer than the spacer grid 30. A pair of resilient O-rings 34 are positioned over the tube 32 at the ends of the spacer grid 30 and the ends of the tube 32 are folded back over these two O-rings. A cup shaped end cap 36 is then threaded onto the distal end of the conduit 22 to seal off the end of the conduit. Moreover the cap 36 has an annular groove 38 which receives the O-ring 34 and compresses it against the end of the spacer grid 30 and against the conduit 22 to seal off the ends of the tube 32 so that all liquid flowing into or out of the cartridge 14 must pass through the main body of the tube 32.

At the inner end of the cartridge 14 there is provided a tubular or sleeve-like connector 40 having an internal thread 42 which mates with the external thread 24 at the end of the conduit 22. The connector 40 is provided with an annular groove or rabbet 44 so that the connector 40 is threaded onto the conduit 22 the O-ring 34 and the overlying portions of the tube 32 are compressed against the end of the spacer grid 30 and the conduit 22. The connector 40 also has an external pipe thread 46 which is adapted to be threaded into the threaded opening in one of the T-fittings 18 as shown in FIG. 1.

Figure 3:
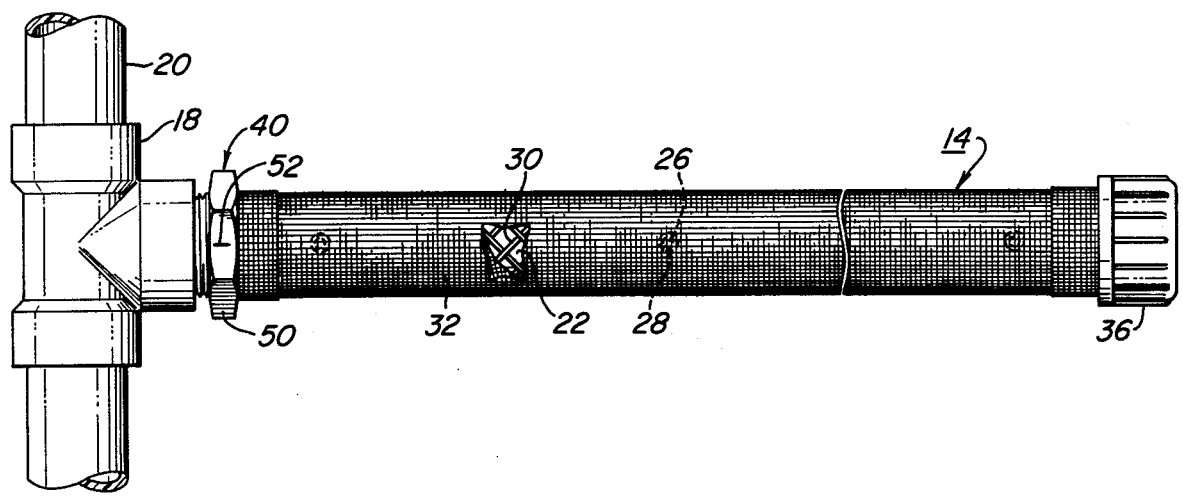
FIG. 3 is an enlarged view of a portion of the distributor-collector assembly of FIG. 1 with a portion of the outer filter tube being broken away.

As best shown in FIG. 3 the connector 40 is provided with a hexagonally shaped external annular portion 48 adapted to be gripped by a wrench. The portion 48 is thus provided with a plurality of flats 50 as best shown in FIG. 3. One of these flats 50 is provided with a reference mark 52 as best shown in FIG. 3, and when the cartridge 14 is initially assembled the fitting 40 is tightened onto the conduit 22 so as to provide a homogeneously sealed joint between the threads 24 and 42 and also to orient the reference line 52 at a position 180° from the row of apertures 26. In this manner the apertures 26 will be at the bottom of the cartridge 14 when the reference mark 52 is at the top in the final assembly.

It will be seen by those skilled in the art that the cartridge 14 may thus be assembled in its entirety before it is connected into the distributor-collector assembly 12. Since a pipe thread 46 is provided on the connector 40 and a comparable thread is provided on the fitting 18, a good tight sealed connection can be provided between each cartridge 14 and its associated T-fitting while permitting adjustment of the angular position of the reference mark 52 and thus the apertures 26 relative to the overall distributor-collector assembly. After the assembly has been completed, and this is generally accomplished within the column itself, all of the reference lines 52 should be at the top where they can be readily seen by an inspector. Therefore, after the assembly has been completed, it is possible to determine by inspection whether the cartridges are all properly aligned within the column. Because of the importance of these apertures all being properly aligned, this is a most important advantage of the present invention.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A distributor-collector assembly, comprising in combination
    a rigid conduit provided with a row of precisely dimensioned apertures accurately located in the wall thereof,
    an axially rigid tubular grid fitted over said conduit with one end of said conduit extending beyond one end of said grid,
    a fine mesh flexible sleeve fitted over said grid and extending outwardly beyond said one end of said grid,
    said sleeve and said grid obscuring said apertures,
    closure means secured to the other end of said conduit for closing said other end of said conduit and for sealing said sleeve to said conduit in proximity to said other end,
    an annular resilient gasket positioned over said sleeve adjacent to and beyond said one end of said grid,
    said one end of said conduit being provided with an external screw thread,
    an annular connector element having an internal screw thread mating with said external thread on said conduit removably to secure said connector element to said conduit,
    said annular connector element having means thereon which cooperates with said gasket to seal said sleeve to said conduit beyond said one end of said grid,
    a manifold having an internally screw threaded port,
    said annular connector element having an external screw thread mating with said internally threaded port sealably to affix said conduit to said manifold,
    said annular connector element having externally disposed visible indicia angularly located at a predetermined position relative to said row of apertures to show the precise angular location of said row of apertures relative to said manifold after assembly of said connector element to said manifold.

2. The combination set forth in claim 1 wherein
    said annular connector includes an annular skirt which overlies said resilient gasket and compresses said gasket and the underlying portion of said fine mesh flexible sleeve against said conduit.

* * * * *